(12) United States Patent  (10) Patent No.: US 9,172,379 B1
How  (45) Date of Patent: Oct. 27, 2015

(54) EFFICIENT CONTROLLERS AND IMPLEMENTATIONS FOR ELASTIC BUFFERS

(71) Applicant: Altera Corporation, San Jose, CA (US)

(72) Inventor: Dana How, Palo Alto, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/497,827

(22) Filed: Sep. 26, 2014

(51) Int. Cl.
*G06F 7/38* (2006.01)
*H03K 19/173* (2006.01)
*H03K 19/177* (2006.01)
*G06F 17/50* (2006.01)

(52) U.S. Cl.
CPC .......... *H03K 19/1737* (2013.01); *G06F 17/505* (2013.01); *G06F 17/5054* (2013.01); *H03K 19/17748* (2013.01)

(58) Field of Classification Search
CPC ........................................................ H03K 5/135
USPC ............................................ 326/38, 40, 46, 93
See application file for complete search history.

(56) References Cited

U.S. PATENT DOCUMENTS

| 6,594,748 B1* | 7/2003 | Lin .............................. 711/167 |
| 8,179,161 B1* | 5/2012 | Williams et al. ................ 326/86 |
| 2008/0187084 A1* | 8/2008 | Lim et al. ...................... 375/371 |
| 2011/0176653 A1* | 7/2011 | Veggetti et al. ................ 377/64 |

* cited by examiner

*Primary Examiner* — Don Le
(74) *Attorney, Agent, or Firm* — Ropes & Gray LLP (57) ABSTRACT

Systems and methods relating to an elastic buffer for dynamically adjusting depth of a data-path implemented on an integrated circuit device. The device includes a first flip-flop, a second flip-flop, a multiplexer, and a controller. The first and second flip-flops are arranged in a cascade configuration with the multiplexer interposed therebetween. In certain embodiments, the multiplexer is capable of selecting between input received upstream and the output of the first flip-flop. The controller utilizes control logic to drive the first and second flip-flops and the multiplexer. The first and second flip-flops, and the multiplexer may represent an elastic buffer subunit corresponding to a single bit within a larger elastic buffer, in which a plurality of elastic buffer subunits are cascaded to form the elastic buffer along with a single shared controller.

22 Claims, 9 Drawing Sheets

EFFICIENT CONTROLLERS AND IMPLEMENTATIONS FOR ELASTIC BUFFERS

FIELD

This disclosure relates to integrated circuit devices, and, particularly, to such devices having a programmable fabric and a communication network integrated with the programmable fabric for high-speed data passing.

BACKGROUND

The core of a programmable circuit, such as a field-programmable gate array (FPGA), includes programmable logic components, such as lookup tables (LUTs) and flip-flops, as well as "hard" components, such as IOs, memories, and DSP blocks. Conventionally, these circuits have been used to build cycle-accurate pipelined machines. As performance targets increase, these machines become more and more pipelined in order to meet the increased operating frequency (i.e., decreased cycle time) requirements. Simultaneously, the time it takes a signal to traverse a fixed proportion of a chip increases compared to the cycle time, not only because the cycle time is decreasing, but also because process scaling is not delivering wires that fully follow the process scaling curve.

It has become increasingly desirable to pipeline transmission time into segments, as well as decompose logic clouds into smaller and smaller pipelined pieces. Unfortunately, this additional comprehensive conventional rigid pipelining is not fully compatible with another increasing trend in system design, namely the proliferation of subcomponents running at different effective data rates, which requires handshaking between the subcomponents to keep the separate data rates matched. Such matching may be performed with a conventional FIFO. However, such a "heavyweight" solution may not always be desirable.

SUMMARY

This disclosure relates to devices having a programmable fabric and a communication network integrated with the programmable fabric for high-speed data passing. Handshaking between subcomponents of such a device to match separate data rates may be performed by multiple elastic buffers. The elastic buffers may include pipeline registers with a controller per register to regulate the register's elasticity and provide an easy-to-use FIFO-like interface. These controllers may automatically suppress clocks to the registers they control, providing optimal data-driven clock gating for power reduction. Accordingly, systems and methods relating to efficient elastic buffer controllers for converting pipeline registers into elastic buffers are described.

In some aspects, an elastic buffer for dynamically adjusting depth of a data-path implemented on an integrated circuit device includes a first flip-flop, a second flip-flop, a multiplexer, and a controller. The first flip-flop and the second flip-flop are arranged in a cascade configuration with the multiplexer interposed therebetween. In certain embodiments, the multiplexer is capable of selecting between input received upstream and the output of the first flip-flop. The controller utilizes control logic to drive the first flip-flop, the second flip-flop, and and the multiplexer. For example, the controller may dynamically drive the multiplexer to select between the upstream input and the output of the first flip-flop, thereby dynamically changing the depth of the elastic buffer. The first flip-flop, the second flip-flop, and the multiplexer may represent an elastic buffer subunit corresponding to a single bit within a larger elastic buffer, in which a plurality of elastic buffer subunits are cascaded to form the elastic buffer along with a single shared controller.

In certain embodiments, the controller includes a first state register and a second state register arranged in a parallel configuration, and a first 2-input gate and a second 2-input gate for driving the first state register and the second state register, respectively. The controller may also utilize next state logic based on the first state register and the second state register, and the next state logic may be one gate deep. In certain embodiments, the control logic generates enable signals as inputs for each of the first flip-flop and the second flip-flop and generates a select signal as an input for the multiplexer. In certain embodiments, the control logic generates clock gating signals.

In some aspects, a logic module for implementing a flip-flop based elastic buffer on an integrated circuit device includes a first flip-flop, a second flip-flop, and a multiplexer. Inputs to each of the first flip-flop and the second flip-flop are driven by the multiplexer, and a select input of the multiplexer is driven at least in part by user-configurable logic. In certain embodiments, the multiplexer is further driven by a plurality of configuration bits in addition to the user-configurable logic.

In some aspects, a process for mapping elastic buffers of a user design in a logic module of an integrated circuit includes identifying an elastic buffer in the user design, and identifying a flip-flop pair within the logic module. The elastic buffer is then automatically mapped to the flip-flop pair such that an elastic buffer controller drives a multiplexer interposed with the flip-flop pair. In certain embodiments, the process automatically converts at least one internal control signal of the elastic buffer into a clock gating signal using clock gating resources of the programmable logic device. The process may be performed by a processor, for example, and may be encoded as instructions, on a transient or non-transient machine readable medium, that are executed by a processor.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION

This disclosure relates to devices having a programmable fabric and a communication network integrated with the programmable fabric for high-speed data passing. Handshaking between subcomponents of such a device to match separate data rates may be performed by multiple elastic buffers. The elastic buffers may include pipeline registers with a controller per register to regulate the register's elasticity and provide an easy-to-use FIFO-like interface. These controllers may automatically suppress clocks to the registers they control, providing optimal data-driven clock gating for power reduction. Accordingly, systems and methods relating to efficient elastic buffer controllers for converting pipeline registers into elastic buffers are described.

Figure 1:
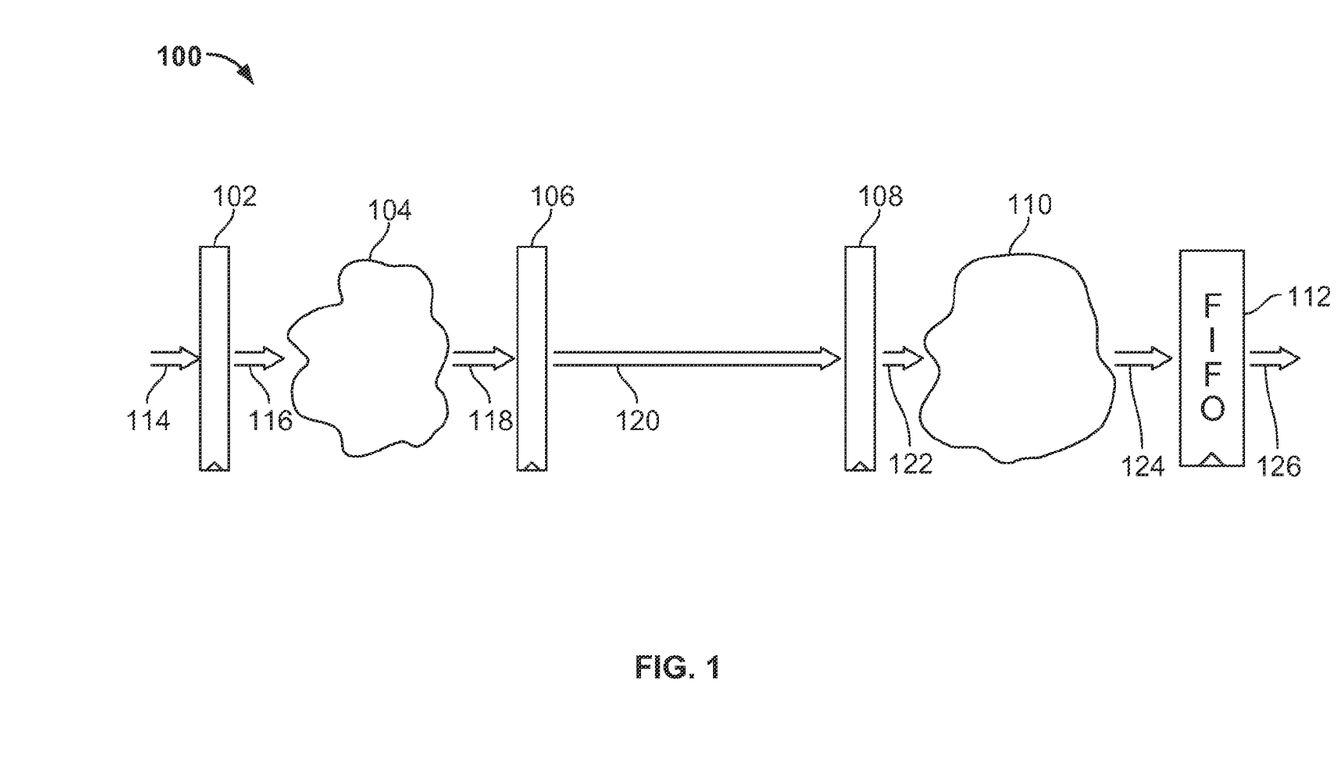
FIG. 1 is an illustrative diagram of a pipelined data-path according to certain embodiments.

FIG. 1 is an illustrative diagram of a pipelined data-path. Data-path 100 includes several pipeline registers (e.g., pipeline registers 102, 106, and 108) in between logic clouds (e.g., logic clouds 104 and 110) and wire connections (e.g., wires 114, 118, 120, 122, 124, and 126). "Hardened" synchronous blocks may also be included in data-path 100. Synchronous FIFO module 112 is located at the end of data-path 100. Variants of this basic design could include feedback paths, multiple clocks (including gated clocks), and/or multiple hardened blocks. In general, if data-path 100 is needed to handle a foreign or irregular data rate, ad-hoc control may be added between adjacent pairs of pipeline registers to regulate the flow of data forward through the pipeline. For example, control modules may be placed in between registers 106 and 108. However, this approach may be costly in that the addition of ad-hoc control logic needs to be specified, developed, and verified.

Figure 2:
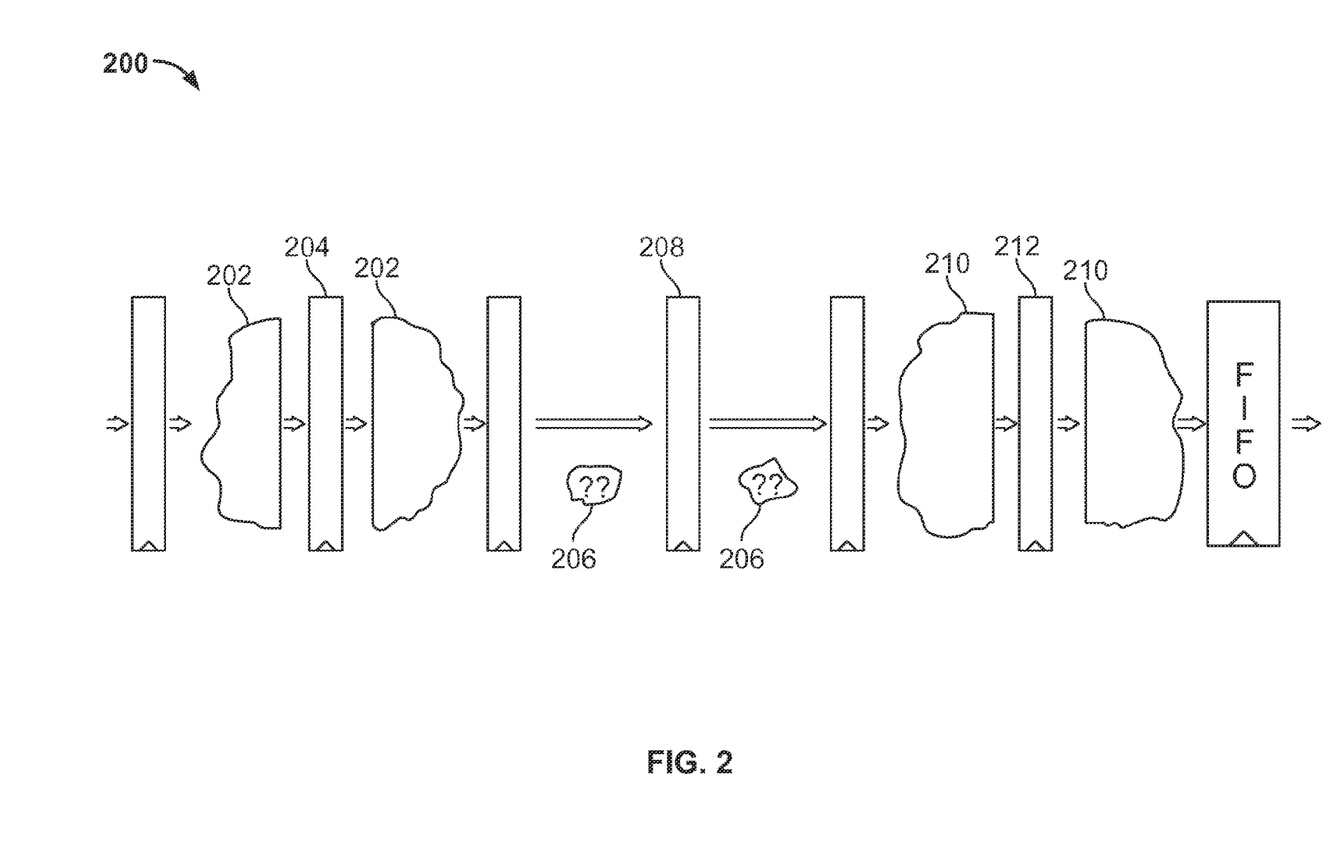
FIG. 2 is an illustrative diagram of the pipelined data-path of FIG. 1 in which the pipeline registers have been doubled according to certain embodiments.

FIG. 2 is an illustrative diagram of the pipelined data-path of FIG. 1 in which the pipeline registers have been doubled. Data-path 200 includes several pipeline registers in between logic clouds (e.g., logic clouds 202 and 210) and wire connections. "Hardened" synchronous blocks may also be included in data-path 200. A synchronous FIFO module is located at the end of data-path 200. Data-path 200 is similar to data-path 100 except that registers 204, 208, and 212 have been inserted. Logic clouds 202 and 210 are divided in half by registers 204 and 212, respectively. Doubling the number of registers can effectively halve the logic and wire delay between each stage. This allows for cycle time to be reduced, thus allowing the entire system to run at a higher frequency. If adjustments to different data rates are needed or desired, ad-hoc modifications can be included. For example, ad-hoc logic 206 added near register 208 can pipeline long wire delay.

Figure 3:
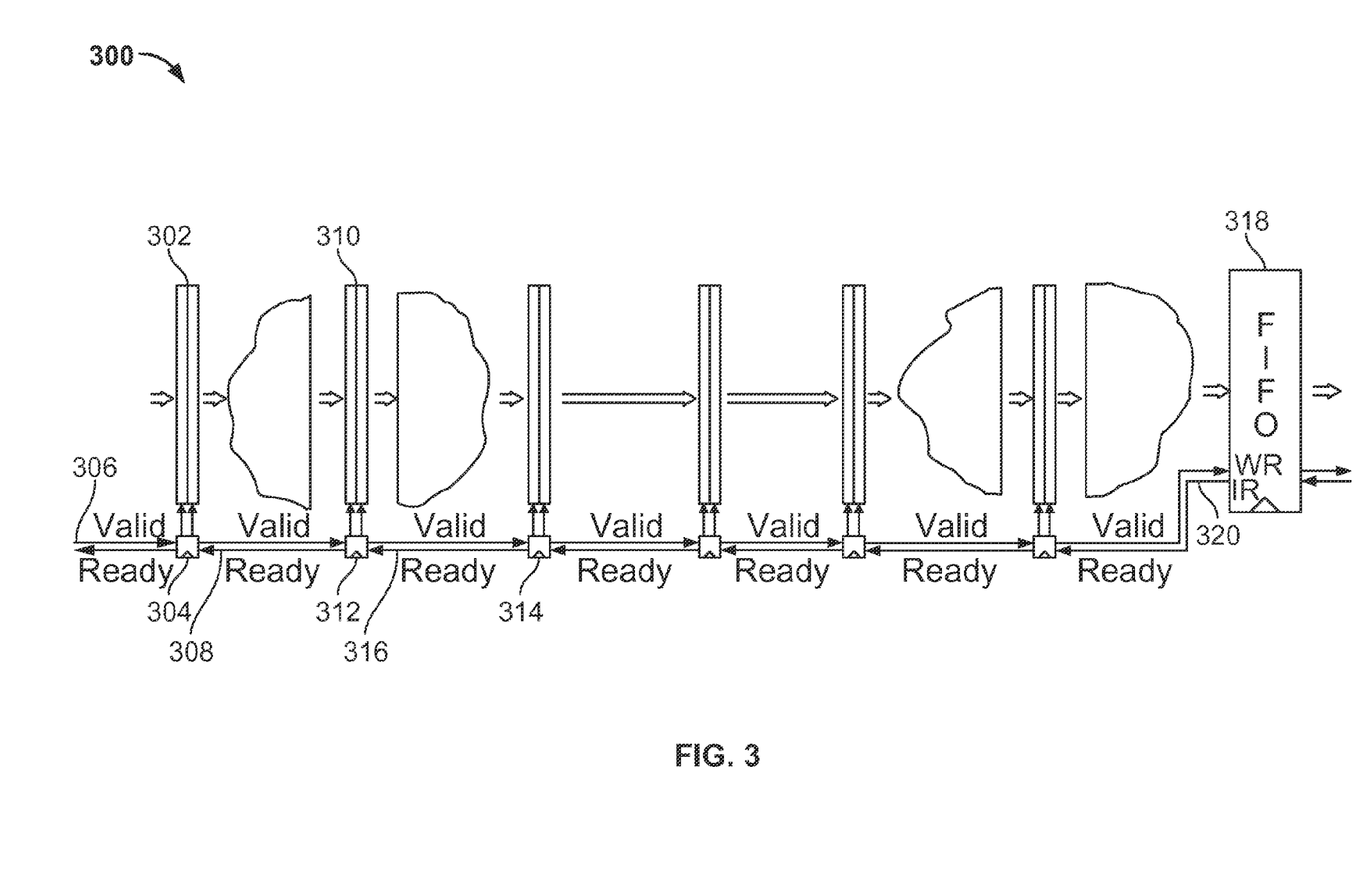
FIG. 3 is an illustrative diagram of a pipelined data-path that incorporates elastic buffers according to certain embodiments.

FIG. 3 is an illustrative diagram of a pipelined data-path that incorporates elastic buffers according to certain embodiments. Data-path 300 includes several pipeline registers (e.g., pipeline registers 302 and 310) in between logic clouds and wire connections (e.g., wires 306, 308, 316, and 320). "Hardened" synchronous blocks may also be included in data-path 300. Synchronous FIFO module 318 is located at the end of data-path 300. Data-path 300 is similar to data-path 200 except that the registers have been replaced with elastic buffers, each elastic buffer directed by a small controller. For example, register 204 has been replaced with elastic buffer 310, which has an associated controller 312. Each controller communicates with its immediate neighbor, thus widening the forward data-path from data-only to data-plus-handshaking, the latter being an "elastic" or FIFO-style interface. For example, controller 312 is in communication with neighboring controllers 304 and 314 via handshaking wires 308 and 316, respectively. The additional handshaking wires do not travel any further than their companion data, and each is registered at each controller. Thus, the wires do not, in general, make timing closure any more difficult than the forward data-path already has.

Figure 4:
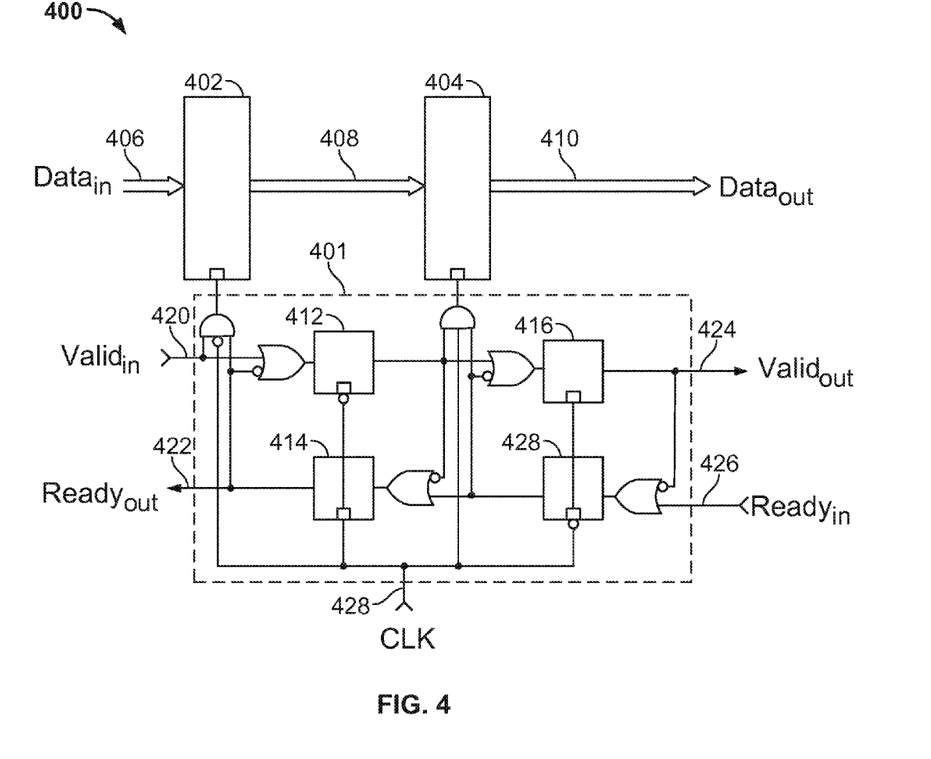
FIG. 4 is an illustrative diagram of an elastic buffer and controller according to certain embodiments.

FIG. 4 is an illustrative diagram of an ASIC elastic buffer and controller according to certain embodiments. Elastic buffer subunit 400 is representative of any of the elastic buffer/controller pairs of FIG. 3 (e.g., register 310 and controller 312). Controller 401 receives a clock signal from clock 428 and sends an inverted clock signal to master latch 402 and a non-inverted clock signal to slave latch 404. Master latch 402 and slave latch 404 behave as a master-slave flip-flop. Master latch 402 receives data via wire 406 from its upstream neighboring buffer subunit ("sender"), transfers the data to slave latch 404 via wire 408. Slave latch 404 then transfers the data to its downstream neighboring buffer subunit ("receiver") via wire 410.

Controller 401 includes components 412, 414, 416, and 418. Handshaking wires from neighboring controllers (e.g., handshaking wires 308 and 316) are represented by wires 420, 422, 424, and 426. When the receiver downstream is not ready, controller 401 will allow the current data item to remain in slave latch 404. Since there is a one-cycle latency in repeating the non-ready signal upstream, elastic buffer subunit 400 may have to tolerate receiving one additional data item. If this is the case, that data item is stored separately in master latch 402. Conversely, when the receiver is accepting but the sender upstream has stopped sending data, any item stored in slave latch 404 will be absorbed by the receiver, and then over-written from master latch 402 if slave latch 404 is still storing an additional unique data item. An ASIC controller, as represented by controller 401, must therefore have three states corresponding to 0, 1, or 2 pieces of data residing in the master-slave latch pair.

In an ASIC, flip-flops are generally more expensive in area than latches, the latter of which are frequently used to save area or, in demanding applications, to increase performance through time-borrowing. In certain embodiments, in an FPGA, cost for small components is predominantly determined by the number of pins they need to have connected, and the small differences in area for the underlying transistors are completely overshadowed. Since latches and flip-flops have the same number of pins, additional expense would be incurred in order to have both (e.g., CRAM configuration bits, mode pins, etc.); therefore, many FPGAs provide only flip-flops. In rare cases in which a latch is truly required, it can be provided by making a feedback connection around a LUT configured as a multiplexer.

Although elastic buffers may be used in application-specific integrated circuits (ASICs) and system-on-chip (SoC) devices, elastic buffer designs utilizing flip-flops have not been explored partly due to the availability of latches in ASICs. The present disclosure relates to elastic buffers with similar externally-visible behavior, but with a flip-flop-based internal design suitable for flip-flop-based configurable fabrics.

Figure 5:
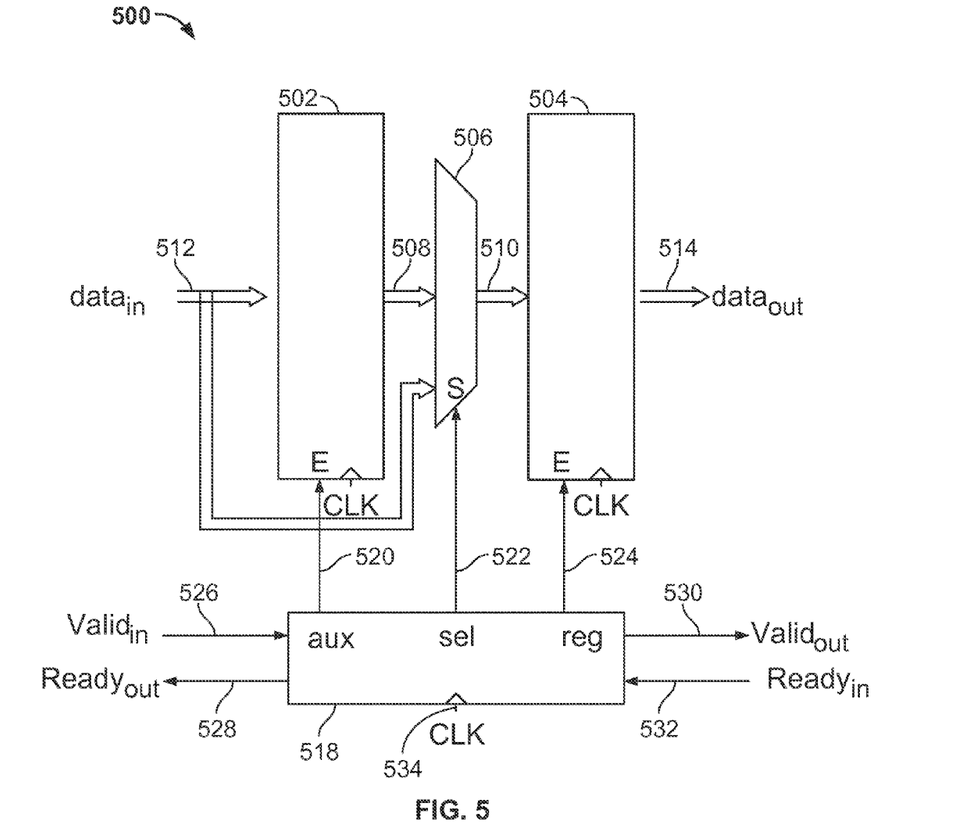
FIG. 5 is an illustrative diagram of an elastic buffer according to certain embodiments.

FIG. 5 is an illustrative diagram of an elastic buffer according to certain embodiments. Elastic buffer subunit 500 is an elastic buffer corresponding to a single bit in a data pipeline optimized for an FPGA in which only flip flops are used. In certain embodiments, the efficient implementation of a bit in an elastic buffer in an FPGA utilizes two cascaded flip-flops and a multiplexer interposed between the two cascaded flip-flops so that the assembly can dynamically change between being one position deep or two positions deep. Elastic buffer subunit 500 includes flip-flop 502 and flip-flop 504 (i.e., a flip-flop pair) arranged in a cascade configuration. Multiplexer 506 is interposed between flip-flops 502 and 504, and is configured to receive and select between the output 508 of flip-flop 502 and data-in wire 512. Data-in wire 512 is connected to a neighboring upstream elastic buffer module and provides input to flip-flop 502 and multiplexer 506. The output of multiplexer 506 serves as the input to flip-flop 504 via wire 510. The output of flip-flop 504 is received by a downstream elastic buffer subunit via data-out wire 514.

Controller 518 drives flip-flops 502 and 504 by enable lines 520 and 524, respectively. Multiplexer select line 522 selects between the output from flip-flop 502 and data-in wire 512. This configuration allows for controller 518 to dynamically change the depth of elastic buffer subunit 500 between one position deep (i.e., flip-flop 504 only) and two positions deep (i.e., flip-flop 502 cascaded with flip-flop 504). Each of flip-flop 502, flip-flop 504, and controller 518 receive the same clock signal from clock 534. Handshaking wires from neighboring controllers are represented by lines 526, 528, 530, and 532.

Figure 6:
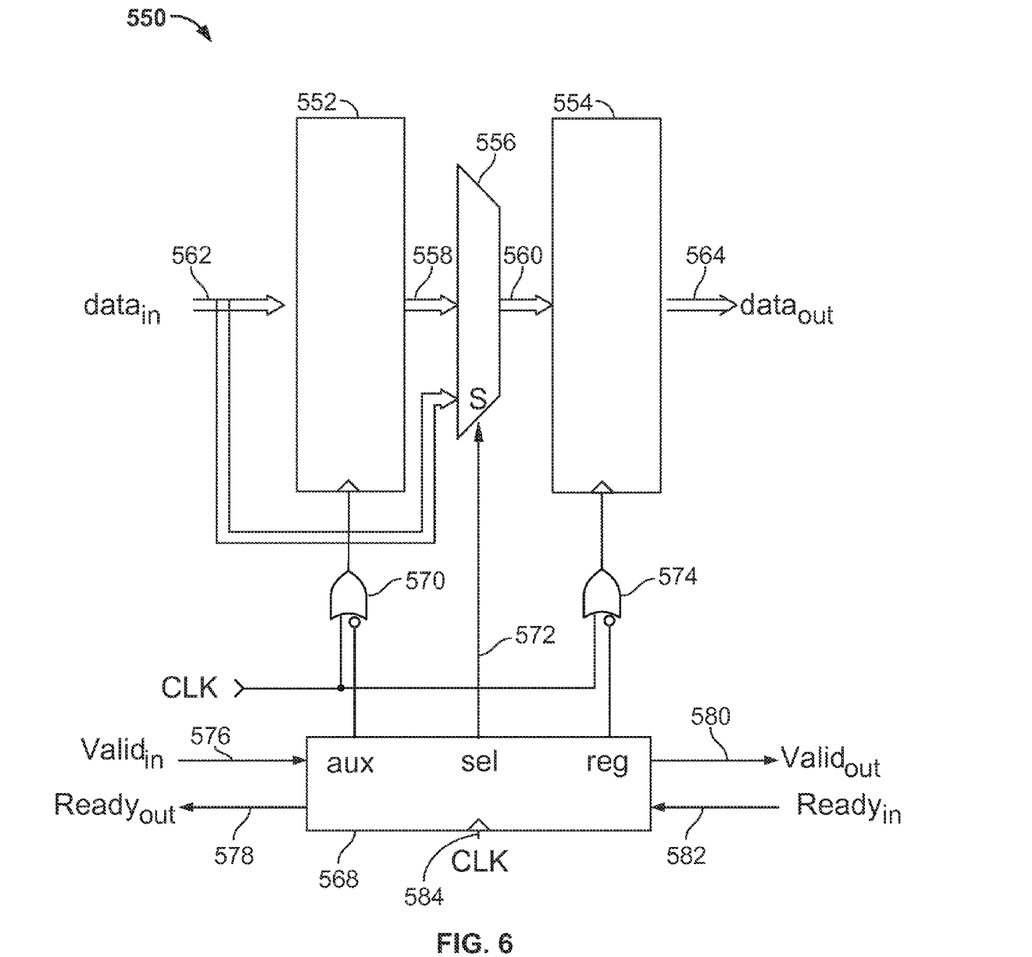
FIG. 6 is another illustrative diagram of an elastic buffer according to certain embodiments.

FIG. 6 is another illustrative diagram of an elastic buffer according to certain embodiments. In this arrangement, one or more internal control signals are converted into clock gating signals using clock gating resources in an FPGA. Elastic buffer subunit 550 is an elastic buffer corresponding to a single bit in a data pipeline optimized for an FPGA in which only flip flops are used. In one aspect, the efficient implementation of a bit in an elastic buffer in an FPGA utilizes two cascaded flip-flops and a multiplexer interposed between the two cascaded flip-flops so that the assembly can dynamically change between being one position deep or two positions deep. Elastic buffer subunit 550 includes flip-flop 552 and flip-flop 554 (i.e., a flip-flop pair) arranged in a cascade configuration. Multiplexer 556 is interposed between flip-flops 552 and 554, and is configured to receive and select between the output 558 of flip-flop 552 and data-in wire 562. Data-in wire 562 is connected to a neighboring upstream elastic buffer module and provides input to flip-flop 552 and multiplexer 556. The output of multiplexer 556 serves as the input to flip-flop 554 via wire 560. The output of flip-flop 554 is received by a downstream elastic buffer subunit via data-out wire 564.

Controller 568 drives flip-flops 552 and 554 by enable lines that are clock gated using clock gating resources 570 and 574, respectively. Multiplexer select line 572 selects between the output from flip-flop 552 and data-in wire 562. This configuration allows for controller 568 to dynamically change the depth of elastic buffer subunit 500 between one position deep (i.e., flip-flop 554 only) and two positions deep (i.e., flip-flop 552 cascaded with flip-flop 554). Each of flip-flop 552, flip-flop 554, and controller 568 receive the same clock signal from clock 584. Handshaking wires from neighboring controllers are represented by lines 576, 578, 580, and 582.

Figure 7:
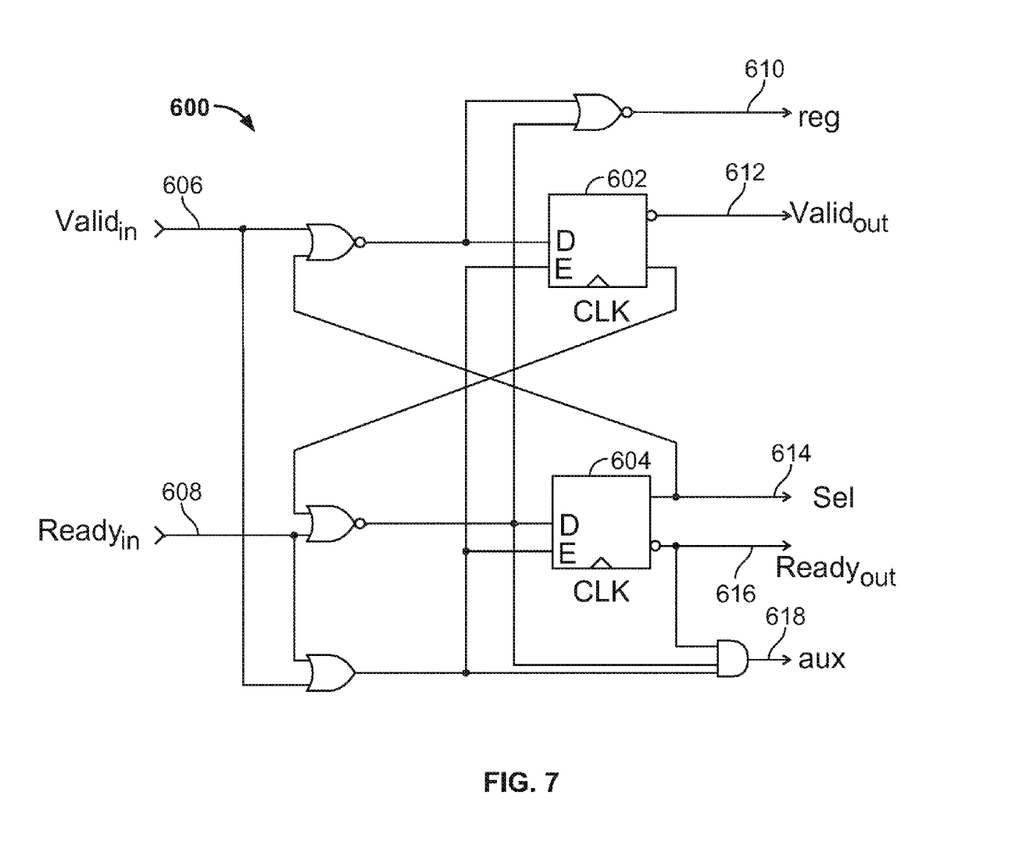
FIG. 7 is an illustrative diagram of an elastic buffer controller according to certain embodiments.

FIG. 7 is an illustrative diagram of an elastic buffer controller according to certain embodiments. Controller 600 illustrates the design of controller 518, including valid_in line 606, ready_in line 608, valid_out line 612, and ready_out line 616 which correspond to lines 526, 532, 530, and 528, respectively. Output lines 610, 614, and 618 correspond to lines 524, 522, and 520, respectively. State registers 702 and 704 are arranged in a parallel configuration, and are driven by two 2-input gates. Controller 600 utilizes next state logic based on registers 502 and 504, in which the state-encoding is as follows:

1-token: v_out=1, r_out=1
2-tokens: v_out=1, r_out=0
0-tokens: v_out=0, r_out=1

The design of controller 600 is advantageous in that there need not be more than a single gate's worth of logic between adjacent controllers, and the register clock enables (e.g., lines 610 and 618) have only two gate delays. The transitions implemented by controller 600 are shown in Table 1. Register clock enables are turned on as infrequently as possible, which in turn saves clocking power. It is to be understood that numerous variants of this circuit may be implemented, including those based on negating either or both of the state bits.

TABLE 1

| in | | out | | next | | | | |
|---|---|---|---|---|---|---|---|---|
| v | r | v | r | v | r | aux | sel | reg |
| 1 | 1 | 1 | 1 | 1 | 1 | 0 | 0 | 1 |
| 1 | 0 | 1 | 1 | 1 | 0 | 1 | x | 0 |
| 0 | 1 | 1 | 1 | 0 | 1 | 0 | x | 0 |
| 0 | 0 | 1 | 1 | 1 | 1 | 0 | x | 0 |
| 1 | 1 | 1 | 0 | 1 | 1 | 0 | 1 | 1 |
| 1 | 0 | 1 | 0 | 1 | 0 | 0 | x | 0 |
| 0 | 1 | 1 | 0 | 1 | 1 | 0 | 1 | 1 |
| 0 | 0 | 1 | 0 | 1 | 0 | 0 | x | 0 |
| 1 | 1 | 0 | 1 | 1 | 1 | 0 | 0 | 1 |
| 1 | 0 | 0 | 1 | 1 | 1 | 0 | 0 | 1 |
| 0 | 1 | 0 | 1 | 0 | 1 | 0 | x | 0 |
| 0 | 0 | 0 | 1 | 0 | 1 | 0 | x | 0 |

Figure 8:
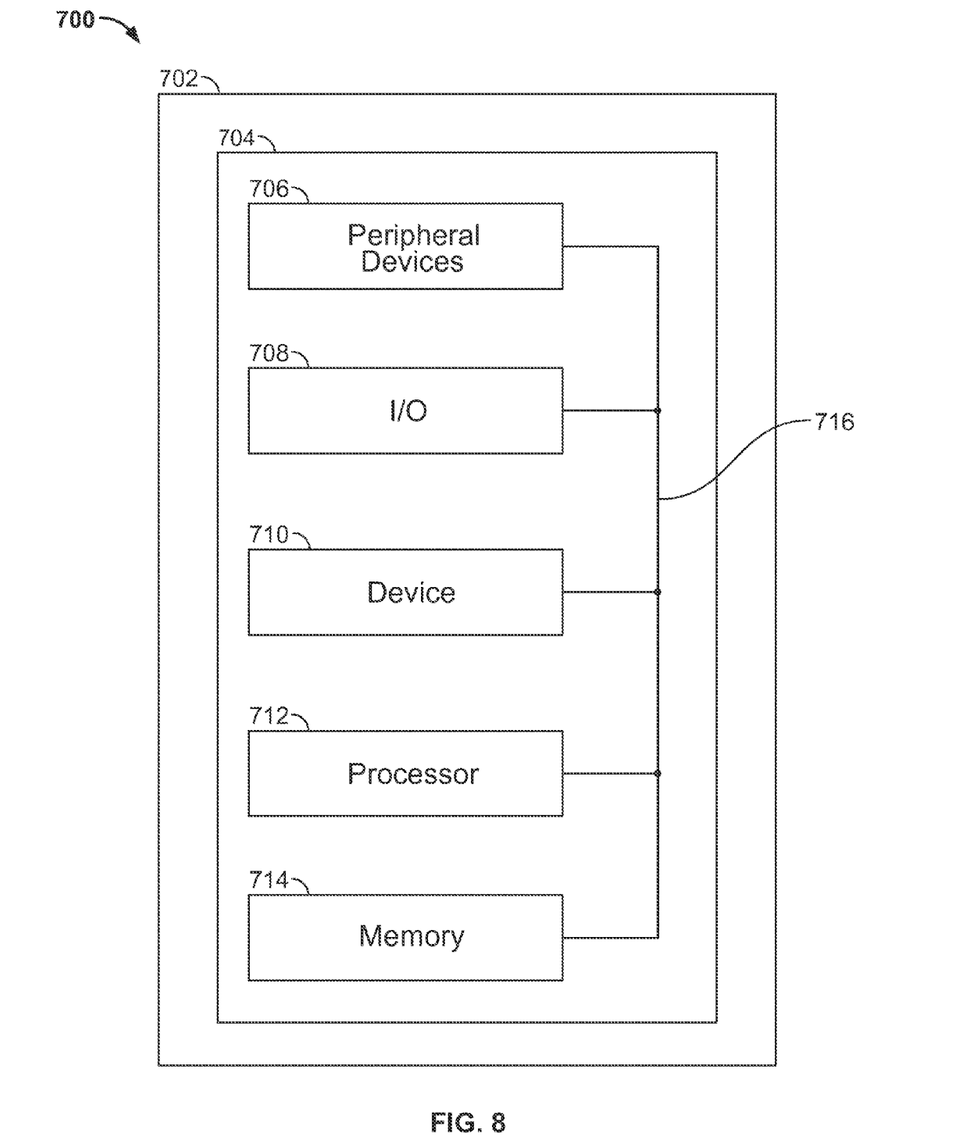
FIG. 8 is an illustrative block diagram of a system employing a programmable logic device incorporating the present invention.

FIG. 8 is an illustrative block diagram of a system employing a programmable logic device incorporating the present invention. A device programmed according to the present invention may be used in many types of electronic devices. One possible use is in a data processing system 700 shown in FIG. 8. Data processing system 700 may include one or more of the following components: device 710, a processor 712, memory 714, I/O circuitry 708, and peripheral devices 706. These components are coupled together by a system bus 716 and are populated on a circuit board 704 which is contained in an end-user system 702. Any of the embodiments described herein may be implemented in a network-on-chip configuration, as described in accordance with commonly-owned U.S. Patent Application Publication No. 2014/0126572, "Programmable Logic Device with Integrated Network-on-Chip," which is hereby incorporated by reference in its entirety.

Figure 9:
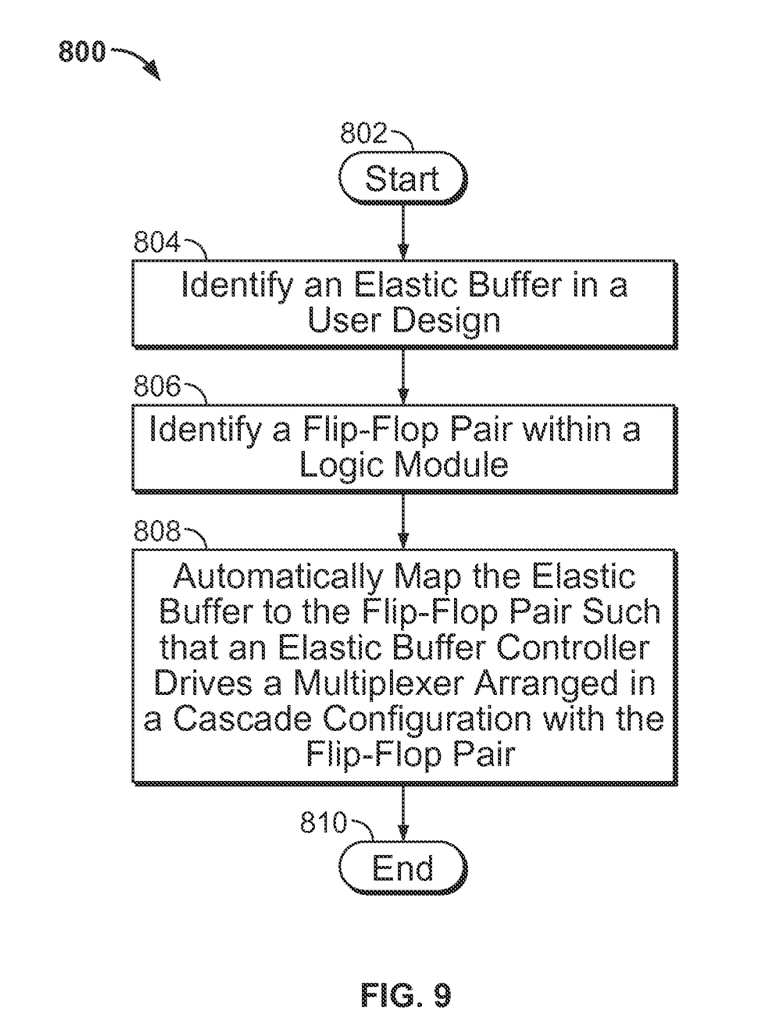
FIG. 9 depicts an illustrative process by which an elastic buffer is mapped to a user design according to certain embodiments.

FIG. 9 depicts an illustrative process by which elastic buffer is mapped to a user design according to certain embodiments. It is noted that the instructions for performing any step of the embodiments described herein may be encoded on machine-readable media. Machine-readable media includes any media capable of storing data. The machine-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

Process 800 may be implemented by a programmable logic device, such as data processing system 700 of FIG. 8. The process begins at step 802. At step 804, an elastic buffer is identified in a user design. The user design may be based on a user design file, for example, a Verilog design file generated using any suitable method. The design file may be stored on any suitable media, such as any of the machine-readable media described herein. A processor, such as processor 712, may identify a buffer in the user design by detecting a series of data buffers in a data-path. For example, the user design may include a layout similar to data-path 300, as shown in FIG. 3.

At step 806, the processor identifies a flip-flop pair within a logic module. For example, a logic module of an FPGA may include pairs of flip-flops that are capable of being mapped, and the processor may allocate a suitable number of flip-flop pairs needed to implement the data-path of the user design.

At step 808, the processor automatically maps the elastic buffer to the flip-flop pair. An elastic buffer controller of the user design is configured by the processor to drive a multiplexer interposed within the flip-flop pair. For example, the processor may identify a multiplexer within the logic module and map it to the flip-flop pair such that the flip-flop pair and multiplexer are configured as shown in FIG. 7. In certain embodiments, the processor may automatically convert at least one internal control signal of the elastic buffer into a clock gating signal using clock gating resources of the programmable logic device. The controller implemented in the design may also utilize control logic to drive the flip-flop pair and the multiplexer, which may also be used to generate the clock gating signals. For example, the control logic may be based on a LUT, configuration bits, or user-configurable logic. In certain embodiments, the processor maps user-configurable logic to the elastic buffer such that the multiplexer is driven at least in part by user-configurable logic. Once the mapping is complete, the process ends at step 810.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any suitable device, such as those associated with data processing system 700 as discussed in relation to FIG. 8, could be used to perform one of more of the steps in FIG. 9.

It will be understood that the foregoing uses of the terms "programmable circuit" and "FPGA" and related terms are exemplary, and such use may be applicable to programmable logic devices and other suitable circuits, including but not limited to commercial FPGAs, configurable ASSP devices, configurable DSP and GPU devices, hybrid ASIC/programmable devices, devices which are described as ASICs with programmable logic cores, or programmable logic devices with embedded ASIC or ASSP cores.

It will be understood that the foregoing is only illustrative of the principles of the invention, and that various modifications may be made by those skilled in the art without departing from the scope and spirit of the invention, and the present invention is limited only by the claims that follow. For example, the various inventive aspects that have been discussed herein can either all be used together in certain embodiments, or other embodiments may employ only one or more (but less than all) of the inventive aspects. And if multiple (but less than all) of the inventive aspects are employed, that can involve employment of any combination of the inventive aspects. As another example of possible modifications, throughout this disclosure, particular parameter values are mentioned. These particular values are only examples, and other suitable parameter values can be used instead if desired.

What is claimed is:

1. An elastic buffer for dynamically adjusting a depth of a data-path implemented on an integrated circuit device, the elastic buffer comprising:
   a first flip-flop;
   a second flip-flop;
   a multiplexer, wherein the first flip-flop and the second flip-flop are arranged in a cascade configuration with the multiplexer interposed therebetween; and
   a controller that utilizes control logic to:
      drive the first flip-flop and the second flip-flop and the multiplexer, and
      generate enable signals as inputs for each of the first flip-flop and the second flip-flop and a select signal as an input for the multiplexer.

2. The elastic buffer of claim 1, wherein each of the first flip-flop, the second flip-flop, and the multiplexer correspond to a single bit in the elastic buffer.

3. The elastic buffer of claim 1, wherein the controller comprises:
   a first state register and a second state register arranged in a parallel configuration; and
   a first 2-input gate and a second 2-input gate for driving the first state register and the second state registers, respectively.

4. The elastic buffer of claim 3, wherein the controller utilizes next state logic based on the first state register and the second state register.

5. The elastic buffer of claim 4, wherein the next state logic is one gate deep.

6. The elastic buffer of claim 1, wherein the control logic generates clock gating signals.

7. The elastic buffer of claim 1, wherein the multiplexer is selectable by the controller to dynamically change a depth of the elastic buffer between one position deep and two positions deep.

8. A logic module for implementing a flip-flop-based elastic buffer on an integrated circuit device, the logic module comprising:
   a first flip-flop;
   a second flip-flop arranged in a cascade configuration with the first flip-flop; and
   a multiplexer, wherein:
      inputs to each of the first flip-flop and the second flip-flop are driven by the multiplexer, and
      a select input of the multiplexer is driven at least in part by user-configurable logic.

9. The logic module of claim 8, wherein the select input of the multiplexer is further driven by a plurality of configuration bits.

10. The logic module of claim 8 further comprising a controller for driving the multiplexer.

11. The logic module of claim 10, wherein the controller comprises:
    a first state register and a second state register arranged in a parallel configuration; and
    a first 2-input gate and a second 2-input gate for driving the first state register and the second state registers, respectively.

12. The logic module of claim 11, wherein the controller is configured to generate clock gating signals based on control logic.

13. The logic module of claim 10, wherein the multiplexer is selectable by the controller to dynamically change a depth of the flip-flop-based elastic buffer between one position deep and two positions deep.

14. A non-transient, machine-readable medium for mapping elastic buffers of a user design in a logic module of an integrated circuit, wherein the non-transient machine-readable medium for mapping the elastic buffers of the user design in the logic module of the integrated circuit contains instructions encoded thereon for:
- identifying an elastic buffer in the user design;
- identifying a flip-flop pair within the logic module;
- automatically mapping the elastic buffer to the flip-flop pair such that an elastic buffer controller drives a multiplexer interposed with the flip-flop pair; and
- mapping user-configurable logic to the elastic buffer such that the multiplexer is driven at least in part by the user-configurable logic.

15. The non-transient, machine-readable medium of claim 14 further including instructions encoded thereon for automatically converting at least one internal control signal of the elastic buffer into a clock gating signal using clock gating resources of the programmable logic device.

16. The non-transient, machine-readable medium of claim 15, wherein the buffer controller utilizes control logic to drive the flip-flop pair and the multiplexer.

17. The non-transient, machine-readable medium of claim 16, wherein the buffer controller further utilizes the control logic to generate clock gating signals.

18. The non-transient, machine-readable medium of claim 14 further including instructions encoded thereon for utilizing control logic to dynamically change a depth of the mapped elastic buffer between one position deep and two positions deep.

19. An elastic buffer for dynamically adjusting a depth of a data-path implemented on an integrated circuit device, the elastic buffer comprising:
- a first flip-flop;
- a second flip-flop;
- a multiplexer, wherein the first flip-flop and the second flip-flop are arranged in a cascade configuration with the multiplexer interposed therebetween; and
- a controller that utilizes control logic to drive the first flip-flop and the second flip-flop and the multiplexer, wherein the controller comprises a first state register and a second state register arranged in a parallel configuration.

20. An elastic buffer for dynamically adjusting a depth of a data-path implemented on an integrated circuit device, the elastic buffer comprising:
- a first flip-flop;
- a second flip-flop;
- a multiplexer, wherein the first flip-flop and the second flip-flop are arranged in a cascade configuration with the multiplexer interposed therebetween; and
- a controller that utilizes control logic to drive the first flip-flop and the second flip-flop and the multiplexer, wherein the multiplexer is selectable by the controller to dynamically change a depth of the elastic buffer between one position deep and two positions deep.

21. A non-transient, machine-readable medium for mapping elastic buffers of a user design in a logic module of an integrated circuit, wherein the non-transient machine-readable medium for mapping the elastic buffers of the user design in the logic module of the integrated circuit contains instructions encoded thereon for:
- identifying an elastic buffer in the user design;
- identifying a flip-flop pair within the logic module;
- automatically mapping the elastic buffer to the flip-flop pair such that an elastic buffer controller drives a multiplexer interposed with the flip-flop pair; and
- automatically converting at least one internal control signal of the elastic buffer into a clock gating signal using clock gating resources of the programmable logic device.

22. A non-transient, machine-readable medium for mapping elastic buffers of a user design in a logic module of an integrated circuit, wherein the non-transient machine-readable medium for mapping the elastic buffers of the user design in the logic module of the integrated circuit contains instructions encoded thereon for:
- identifying an elastic buffer in the user design;
- identifying a flip-flop pair within the logic module;
- automatically mapping the elastic buffer to the flip-flop pair such that an elastic buffer controller drives a multiplexer interposed with the flip-flop pair; and
- utilizing control logic to dynamically change a depth of the mapped elastic buffer between one position deep and two positions deep.

\* \* \* \* \*